United States Patent
Glora et al.

(10) Patent No.: US 7,093,587 B2
(45) Date of Patent: Aug. 22, 2006

(54) METHOD AND DEVICE FOR CONTROLLING THE DRIVE UNIT OF A VEHICLE

(75) Inventors: Michael Glora, Markgroeningen (DE); Manfred Weiffen, Schwieberdingen (DE)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 10/864,930

(22) Filed: Jun. 9, 2004

(65) Prior Publication Data

US 2005/0016497 A1   Jan. 27, 2005

(30) Foreign Application Priority Data

Jun. 10, 2003 (DE) ................. 103 26 038

(51) Int. Cl.
*F02D 45/00* (2006.01)
*B60Q 9/00* (2006.01)

(52) U.S. Cl. ............ 123/492; 123/493; 340/436; 340/438; 701/301

(58) Field of Classification Search ............... 123/325, 123/492, 493; 340/435, 436, 438, 439; 701/301
See application file for complete search history.

(56) References Cited

U.S. PATENT DOCUMENTS

| | | | | |
|---|---|---|---|---|
| 4,512,318 A | * | 4/1985 | Ito et al. ................... | 123/492 |
| 6,362,729 B1 | * | 3/2002 | Hellmann et al. .......... | 340/438 |
| 6,856,906 B1 | * | 2/2005 | Winner et al. ............. | 701/301 |

FOREIGN PATENT DOCUMENTS

| | | |
|---|---|---|
| DE | 38 22 193 | 1/1990 |
| DE | 198 57 992 | 6/2000 |

* cited by examiner

*Primary Examiner*—T. M. Argenbright
(74) *Attorney, Agent, or Firm*—Kenyon & Kenyon LLP

(57) ABSTRACT

A method and a device for controlling the drive unit of a vehicle make possible an effective kinesthetic signaling of an event. Based on a detection of the event, an output variable of the drive unit is changed in a stepwise manner, as a function of whether the vehicle is in an overrun state or an acceleration state.

11 Claims, 3 Drawing Sheets

METHOD AND DEVICE FOR CONTROLLING THE DRIVE UNIT OF A VEHICLE

BACKGROUND INFORMATION

It is known that one can record the speed and the distance of a preceding vehicle with the aid of a radar sensor of an adaptive cruise control. These data are used by the adaptive cruise control to regulate in a comfortable manner the speed of the vehicle in dependence upon the traffic situation. In addition, the data of the radar sensor may be used to recognize critical driving situations. Thus, for example, a rear-end collision may be avoided by automatic emergency braking, or its consequences may be greatly reduced.

Moreover, systems are known which, by an unaccustomed vehicle reaction, are intended to point out to the driver a danger situation. Such a vehicle reaction may be implemented either by brief automatic braking, as described in German Patent No. DE 198 57 992, or by a jolt in the power train system, as described in German Patent Application No. DE 38 22 193. Such kinesthetic vehicle reactions that are not influenceable by the driver, experience an unequally higher prioritization by the driver when compared to optical or acoustical warning signals, as compared to the feedback of braking using an antilock system at the brake pedal in contrast to an indication on an instrument cluster.

SUMMARY OF THE INVENTION

The method according to the present invention and the device according to the present invention for controlling the drive unit of a vehicle have the advantage that, based on the detection of an event that is signaled kinesthetically, an output variable of the drive unit is changed stepwise, depending on whether the vehicle is in an overrun (deceleration state) or in an acceleration state. This makes sure that both in overrun and in an acceleration state a jolt is achieved in the power train system that can be experienced as well as possible.

Overrun is able to be detected in a particularly simple way if the value of an output variable corresponding to the driver's command is less than the value of the output variable corresponding to the sum of all losses. The acceleration state is able to be detected in a particularly simple way if the value of an output variable corresponding to the driver's command is greater than the value of the output variable corresponding to the sum of all losses.

It is especially advantageous if the output value is reduced stepwise upon detection of an acceleration state and is increased stepwise upon detection of an overrun. In this way, the jolt in the power train system takes place based on the detection of an event counter to the current operation of the vehicle. Consequently, in the acceleration state, a jerky deceleration effect is achieved, and in overrun a jerky traction effect is achieved. This results in the driver particularly well perceiving the jolt in the power train system.

A further advantage comes about if the stepwise change in the output variable is carried out over a predefined time. This ensures that the driver recognizes the signal effect of the jolt in the power train system if there is a suitable time predefinition.

An additional advantage comes about if the level (quantity) of the stepwise change in the output variable is selected in such a way that, upon detection of the acceleration state the system jumps to the overrun state, and upon detection of the overrun state the system jumps to the acceleration state.

In this way, the perception of the jolt in the power train system is even improved, on account of the operating change.

An additional advantage comes about if the level of the step is selected to be greater in absolute value than the difference between a value of the output variable corresponding to the driver's command and a value of the output variable corresponding to the sum of all losses.

This ensures that, on account of the stepwise change in the output variable, an operating change from the overrun state to the acceleration state and from the acceleration state to the overrun state takes place.

It is especially advantageous if the level of the stepwise change in the output variable is selected as a function of a current drive transmission. This ensures that the jolt in the power train system that may be perceptible to the driver is as independent as possible from the selected gear.

This may be implemented in a simple way in that the level of the stepwise change in the output variable is selected to be smaller for a higher drive transmission ratio than for a lower drive transmission ratio.

DETAILED DESCRIPTION

Figure 1:
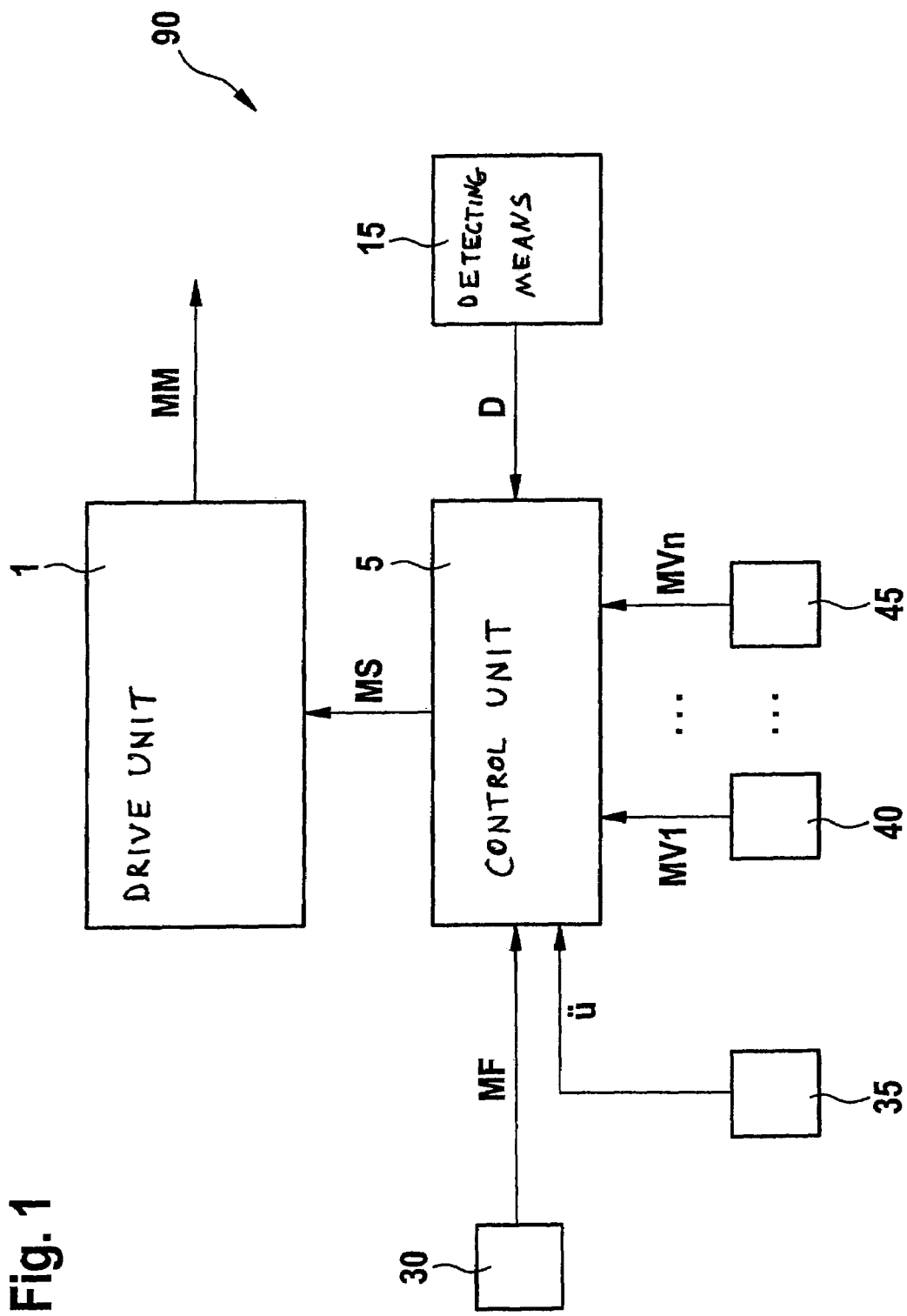
FIG. 1 shows a block diagram of a vehicle.

In FIG. 1, 90 characterizes a vehicle of which a drive unit 1 and a control unit 5 are shown in the form of a block diagram. In this context, drive unit 1 may include, for example, an internal combustion engine, an electric motor or an engine (motor) based on an alternative drive concept. In the case of an internal combustion engine, for example, an Otto engine or a Diesel engine may be involved. Drive unit 1 gives off an output variable, for example, in the form of a torque, a power or a cylinder filling or a variable derived from one of the variables named. In the following, let us assume, for example, that the output variable is a torque, and specifically the engine/motor torque MM given off by the engine/motor of the drive unit. This is then brought to the wheels in the form of a wheel torque, via torque converters and transmissions which are not shown in FIG. 1, for reasons of clarity. Control unit 5 controls drive unit 1 to convert a predefined setpoint value for engine torque MM. In the case, for example, of an internal combustion engine of drive unit 1 designed as an Otto engine, this can be done by an appropriate setting of the air supply, for instance, using a throttle valve, by an appropriate setting of the fuel supply using at least one fuel injector and/or by an appropriate setting of the ignition timing of at least one spark plug. In the case of a Diesel engine, the setpoint value for engine torque MM may be converted by appropriate setting of the fuel supply with the aid of at least one fuel injector.

Furthermore, means 15 are provided for detecting an event which give off a corresponding detection signal D to control unit 5. Such an event, for example, may be produced by at least one operating state of drive unit 1 or by at least one driving situation. Such a driving situation, for example, may be detected by an adaptive cruise control not shown in FIG. 1 in that the speed and the distance of a preceding vehicle are suddenly reduced, so that a rear-end collision threatens to occur. If such an event, for instance, such a threatening rear-end collision accident is detected by means 15, which are also denoted as detection unit, a corresponding detection signal D is given off to control unit 5 by detection unit 15. Consequently, control unit 5 is informed about the event in this example of the threatening rear-end collision accident. Furthermore, control unit 5 is connected to a gas pedal module 30, which specifies a driver command torque MF depending on the activation of the gas pedal by the driver. Driver command torque MF is passed on to control unit 5 by gas pedal module 30.

In addition, n auxiliary components and engine functions are provided, which in FIG. 1 are characterized all-inclusively by reference numerals 40, 45 and which place torque loss requirements MV1, . . . , MVn on control unit 5. In the case of the auxiliary components, for example, an air conditioner, power steering, an electrical sunroof, etc., may be involved. In the case of the engine functions, for example, an idle speed control, an anti-jolt function, etc., may be involved. What is common to the auxiliary components and the engine functions having reference numerals 40, 45, is that they result in torque losses. The sum of all torque loss requirements is designated as MV from here on. Furthermore, according to FIG. 1, a drive unit control 35 is provided which transmits the current transmission ratio ü to control unit 5. According to the present invention, it is provided that an event detected by detection unit 15 is signaled kinesthetically by drive unit 1, for instance, by a jolt in the power train system. For this purpose, upon detection of the event by detection signal D, control unit 5 produces, at least as a function of the driver's command torque MF and of the sum MV of all torque loss requirements, a specification for a torque jump MS, which has to be converted by drive unit 1 by the corresponding setting of the air supply, the fuel supply and/or the ignition timing depending on whether it is an Otto or a Diesel engine.

Figure 2:
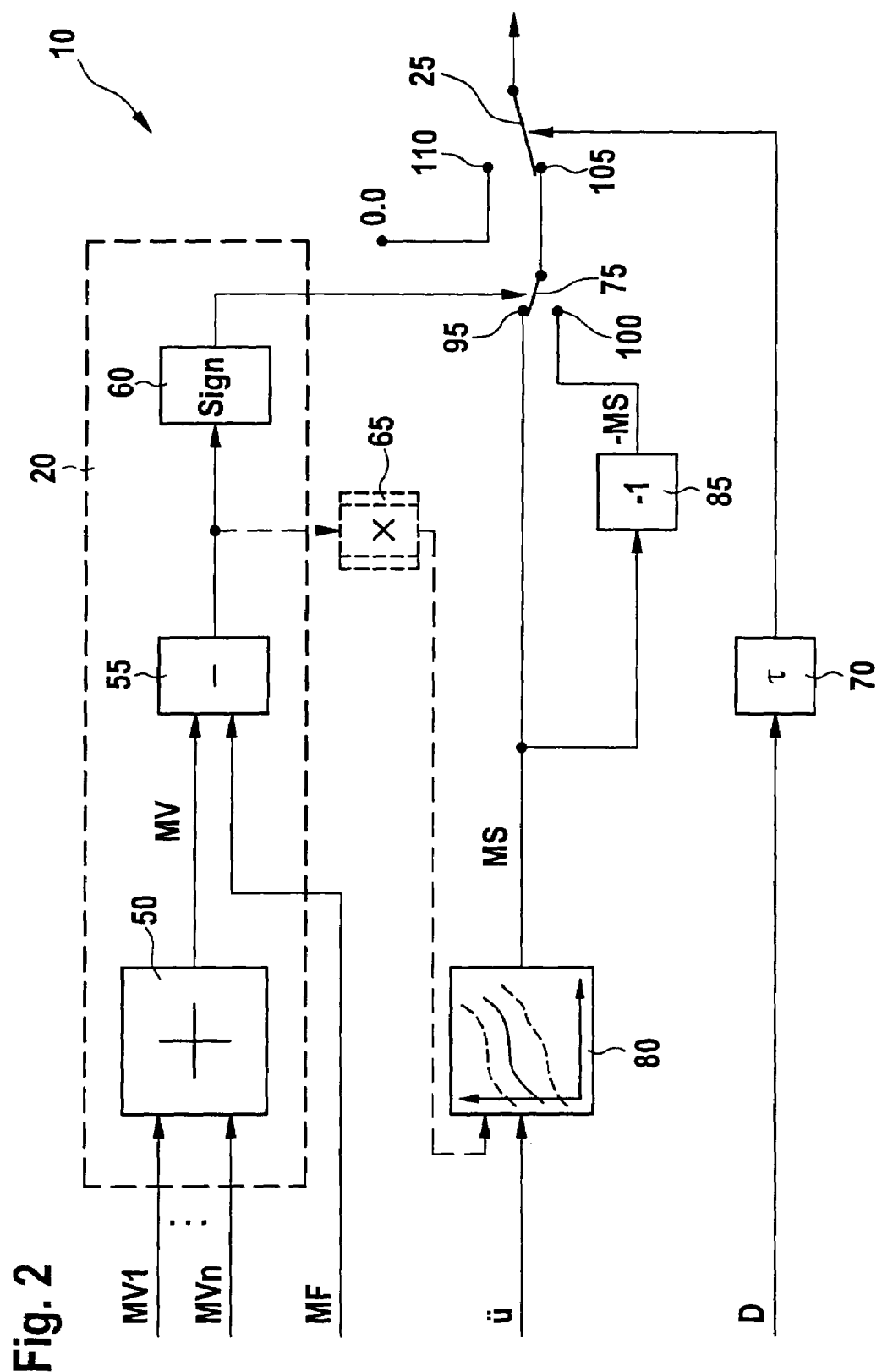
FIG. 2 shows a flow chart for explaining the method according to the present invention and the device according to the present invention.

FIG. 2 shows the sequence of the method according to the present invention in the light of a flow chart, which describes means 10 for the kinesthetic signaling of an event, as was described above. In this context, means 10 may be implemented as software and/or hardware in control unit 5. They encompass means 20 for detecting an overrun state or an accelerating state. In order to achieve as well perceptible a jolt as possible in the power train system, according to the present invention, a differentiation is made as to whether drive unit 1 is supplying positive or negative wheel torques. In the case of positive wheel torques, drive unit 1 operates in the acceleration state, and in the case of negative wheel torques, it operates in the overrun state. The determination as to whether acceleration state or overrun state is present, is made with the aid of means 20. In this context, all the torque loss requirements MV1, . . . , MVn are supplied to an addition member 50, and are added there, so that at the output of addition member 50, the sum MV of all torque loss requirements is present. This is supplied to a subtraction member 55. Also supplied to subtraction member 55 is driver's command torque MF, and it is subtracted there from the sum MV of all torque loss requirements.

The difference resulting at the output of subtraction member 55 is supplied to a sign generator 60. Sign generator 60 ascertains the sign of the difference present at the output of subtraction member 55. If this difference is negative, then the absolute value of the driver's command torque MF is greater than the sum MV of all torque loss requirements, and an acceleration state is present. If this difference is positive, then the absolute value of the driver's command torque MF is less than the sum MV of all torque loss requirements, and an overrun state is present. The output of sign generator 60 controls a first controlled switch 75, and simultaneously represents the output of means 20. It may also be provided, in the method according to the present invention, that one should also take into consideration the current transmission ratio ü, as shown in FIG. 2.

Current transmission ratio ü is supplied to a characteristics curve 80 as an input variable. As a function of current transmission ratio ü, characteristics curve 80 ascertains an assigned torque jump. For this purpose, in characteristics curve 80, for various transmission ratios ü, in each case an assigned torque jump MS is stored. Characteristics curve 80 may, for example, be applied on a test stand and/or in conjunction with driving experiments. The application of characteristics curve 80 takes place, in this context, in an advantageous manner in such a way that the level or the absolute quantity of respective torque jump MS is selected, in the case of a higher transmission ratio in a lower gear, lower than in the case of a lower transmission ratio ü in a higher gear. This ensures, by transmission-ratio-dependent applied torque jump MS, that the jolt in the power train system that is perceptible to the driver is as independent as possible from the selected gear. Torque jump MS at the output of characteristics curve 80 is directly connected to a first input 95 of first controlled switch 75. Furthermore, torque jump MS at the output of characteristics curve 80 is connected, via a sign reversal member 85, to a second input 100 of first controlled switch 75. Sign reversal member 85 multiplies torque jump MS by the value −1. Consequently, first controlled switch 75 can switch over between positive torque jump MS, which was given out by characteristics line 80 and which is present at input 95, and negative torque jump −MS at second input 100.

In the case that the output of sign generator 60 is positive, that is, overrun was detected, first controlled switch 75 is controlled by means 20 or by the output of sign generator 60 in such a way that it connects first input 95 to its output, which corresponds to a first input 105 of a second controlled switch 25. In the case that the output of sign generator 60 is negative, that is, an acceleration state was detected, first controlled switch 75 is controlled by means 20 or by the output of sign generator 60 in such a way that it connects second input 100 to its output, which corresponds to a first input 105 of second controlled switch 25. At a second input 110 of second controlled switch 25, the value zero is constantly present.

Second controlled switch 25 is controlled by the output of a timing element 70. The input of timing element 70 is detection signal D. Timing element 70 has a predefined time constant. Because of detection signal D which is present upon detection of an event described in exemplary form above, timing element 70 is set for the duration of time constant τ, and second controlled switch 25 is controlled for the connection of its first input 105 to its output. The output of second controlled switch 25 then controls drive unit 1 in the manner shown in FIG. 1 for the conversion of the torque jump, in order to implement the desired jolt in the power train system. If the output of timing member 70 is not set, second controlled switch 25 connects its second input 110, and thus the value zero, to its output, and no torque jump is requested by control unit 5 for conversion by drive unit 1. Second controlled switch 25 consequently represents means for the stepwise change of the output variable of drive unit 1 and engine torque MM.

Because of means 10 for the kinesthetic signaling of an event as described above in exemplary form, on account of the detection of such an event, an output variable, in this example engine torque MM, of drive unit 1 is able to be changed in a stepwise manner, depending on whether vehicle 90 is in an overrun state or in an acceleration state. This, for example, leads to a jolt in the power train system of vehicle 90. In this context, means 20 detects the overrun if a value of the output variable corresponding to the drivers command, in this example driver's command torque MF, is less than a value of the output variable corresponding to the sum of all losses, in this example the sum MV of all torque loss requirements. In this context, furthermore, means 20 detects the acceleration state if a value of the output variable corresponding to the driver's command, in this example drivers command torque MF, is greater than a value of the output variable corresponding to the sum of all losses, in this example the sum MV of all torque loss requirements. Because of the described control of first controlled switch 75, it is ensured, when the described events are present, that the output variable of drive unit 1, in this example engine torque MM, upon detection of the acceleration state, is reduced stepwise by the absolute value of torque jump MS, and upon detection of the overrun state, is increased stepwise by the absolute value of torque jump MS.

Optionally, and as shown by dotted lines in FIG. 2, the output of subtraction member 55 may be supplied to an absolute value generator 65, which forms the absolute value of the difference present at the output of subtraction member 55, and supplies the absolute value formed, additionally to the current transmission ratio ü, as a further input variable of characteristics curve 80, which consequently becomes a characteristics map. Torque jump MS is then ascertained as a function of these two input variables, with the aid of characteristics map 80. In this context, the level or rather the absolute quantity of torque jump MS may be selected in such a way that the jump level or the absolute jump quantity is greater than the difference between the driver's command torque MF and the sum MV of all torque loss requirements, so that, upon detection of the acceleration state, the system jumps to overrun, and upon detection of overrun, the system jumps to the acceleration state. In this manner one may achieve an especially effective jolt in the power train system, in that the change from the overrun state to the acceleration state, or vice versa, is made abruptly.

Figure 3:
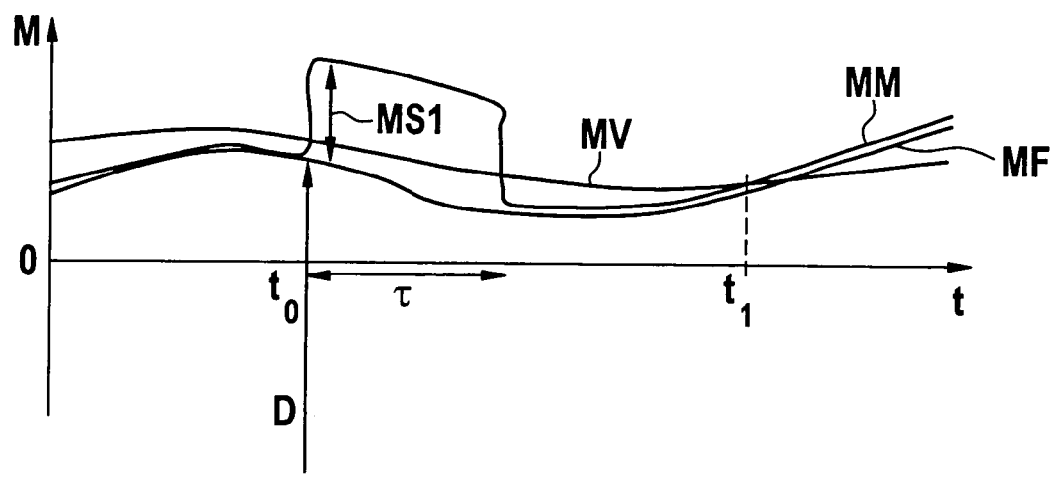
FIG. 3 shows a first torque-time diagram.

FIG. 3 shows a first example of the pattern of engine torque MM plotted against time t. In this context, the sum MV of all torque loss requirements first runs above driver's command torque MF, so that the system is in the overrun state. Engine torque MM is made to follow driver's command torque MF as closely as possible. At a point in time t0, control unit 5 receives detection signal D from detection unit 15, so that at point t0 a warning function is activated in control unit 5, which requests of control unit 5, in the manner described, a first positive torque jump MS1, since drive unit 1 is in the overrun state. First torque jump MS1, in this context, is in absolute value greater than the difference between driver's command torque MF and the sum MV of all torque loss requirements. Therefore, from point in time t0 and for time constant τ, the system jumps from the overrun state to the acceleration state, and subsequently back again to the overrun state. Only at a later point in time t1 does engine torque MM exceed sum MV of all torque loss requirements, so that from point in time t1 onwards the acceleration state is present.

Figure 4:
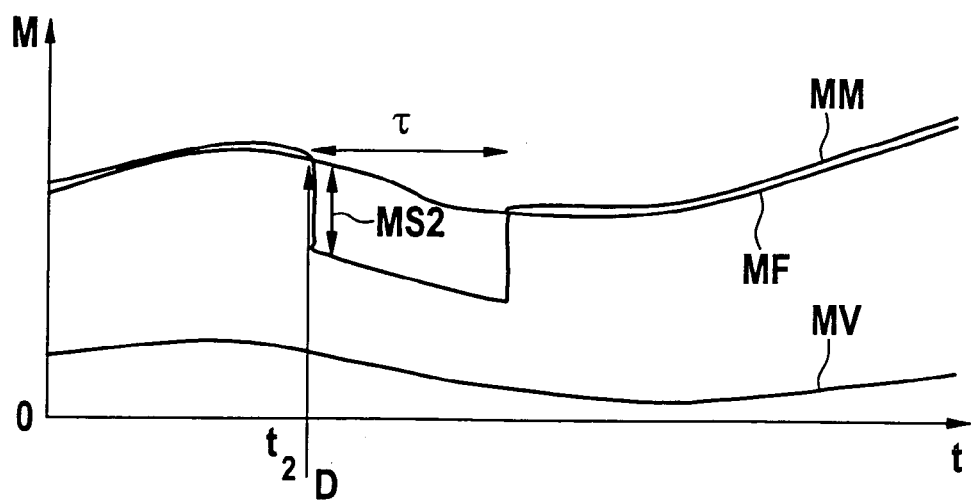
FIG. 4 shows a second torque-time diagram, each for explaining an exemplary torque pattern plotted against time according to the present invention.

FIG. 4 shows a second example of the pattern of engine torque MM plotted against time t. In this context, the sum MV of all torque loss requirements runs below driver's command torque MF, so that the system is in the acceleration state. Engine torque MM is made to follow driver's command torque MF as closely as possible. At a point in time t2, control unit 5 receives detection signal D from detection unit 15, so that at point t2 a warning function is activated in control unit 5, which requests of drive unit 1, in the manner described, a second negative torque jump MS2, since drive unit 1 is in the acceleration state. Second torque jump MS2, in this context, is in absolute value less than the difference between driver's command torque MF and the sum MV of all torque loss requirements. Therefore, from point in time t2, and for time constant τ, engine torque MM is reduced by the absolute value of second torque jump MS2, without a change from acceleration state to overrun state taking place.

Because of the warning function described, for example, a rear-end collision may be prevented within the scope of an adaptive cruise control at a lowering speed and a decreasing distance of a preceding vehicle, when the driver initiates an appropriate braking procedure on account of the kinesthetic signaling.

What is claimed is:

1. A method for controlling a drive unit of a vehicle, the method comprising:
   detecting an event; and
   changing an output variable of the drive unit in a stepwise manner, as a function of whether the vehicle is in an overrun state or a acceleration state, to signal the event kinesthetically.

2. The method according to claim 1, further comprising selecting a torque as the output variable.

3. A method for controlling a drive unit of a vehicle, the method comprising:
   detecting an event;
   changing an output variable of the drive unit in a stepwise manner, as a function of whether the vehicle is in an overrun state or a acceleration state, to signal the event kinesthetically; and
   detecting the overrun state if a value of an output variable corresponding to a driver's command is less than a value of an output variable corresponding to a sum of all losses.

4. A method for controlling a drive unit of a vehicle, the method comprising:
   detecting an event;
   changing an output variable of the drive unit in a stepwise manner, as a function of whether the vehicle is in an overrun state or a acceleration state, to signal the event kinesthetically; and
   detecting the acceleration state if a value of an output variable corresponding to a driver's command is greater than a value of an output variable corresponding to a sum of all losses.

5. A method for controlling a drive unit of a vehicle, the method comprising:
   detecting an event;
   changing an output variable of the drive unit in a stepwise manner, as a function of whether the vehicle is in an overrun state or a acceleration state, to signal the event kinesthetically; and
   reducing a value of the output variable stepwise upon detection of the acceleration state, and increasing a value of the output variable stepwise upon detection of the overrun state.

6. The method according to claim 5, further comprising carrying out a stepwise change of the output variable for a predefined time.

7. The method according to claim 5, wherein a level of a stepwise change in the output variable is selected in such a way that, upon detection of the acceleration state a system jumps to the overrun state, and upon detection of the overrun state the system jumps to the acceleration state.

8. The method according to claim 7, wherein a level of a step is selected to be greater in absolute value than a difference between a value of an output variable corresponding to a driver's command and a value of an output variable corresponding to a sum of all losses.

9. The method according to claim 5, wherein a level of a stepwise change in the output variable is selected as a function of a current transmission rate.

10. The method according to claim 9, wherein the level of the stepwise change in the output variable is selected smaller in the case of a greater transmission ratio than in the case of a lower transmission ratio.

11. A device for controlling a drive unit of a vehicle comprising:
  means for kinesthetically signaling an event;
  means for detecting the event;
  means for detecting at least one of an overrun state and a acceleration state; and
  means for changing an output variable of the drive unit, such that, based on the detection of the event, the output variable of the drive unit is changed in a stepwise manner, as a function of whether the vehicle is in the overrun state or the acceleration state, to signal the event kinesthetically.

* * * * *